Patented June 20, 1939

2,163,169

UNITED STATES PATENT OFFICE 2,163,169

SEPARATION AND PURIFICATION OF GASEOUS MIXTURE

Herbert A. Gollmar, Union Township, Union County, N. J., assignor, by mesne assignments, to Koppers Company, a corporation of Delaware No Drawing. Application January 11, 1936, Serial No. 58,773

14 Claims. (Cl. 23—2)

The present invention relates to improvements in the separation of weakly acidic gases, such as hydrogen sulphide and the like, from gaseous mixtures containing the same, as for example industrial fuel gases, air or products of combustion, and pertains more especially to processes wherein substances containing within their molecular structure an hydroxyl group or groups phenolic in nature, are used in aqueous solution for scrubbing the gaseous mixtures from which it is desired to remove the weakly acidic gases, the hydroxyl group, phenolic in type, having been demonstrated appropriate for this purpose in consequence of distinctive chemical characteristics which make it highly desirable for exploitation in hot-actification liquid purification processes for the removal of impurities from gases.

In the co-pending application of Joseph A. Shaw, Serial No. 570,961 filed October 24, 1931, now Patent 2,028,124 is disclosed a process and suitable apparatus for its practice whereby gases of the nature of hydrogen sulphide may be removed from gaseous mixtures containing the same and by employing an alkaline solution of phenol, or any of its alkylated substitution products, such as, the cresols, xylenols, etc., or mixtures thereof as are found in the commercial product known as "tar acids".

The therein disclosed process is a continuous one, comprising, an absorption step, and a regeneration step for the fouled solution used in the absorption step and practised substantially in the manner used in liquid purification processes in general. In the absorption step, the gaseous mixture to be processed is brought into intimate contact in a gas-and-liquid contact apparatus with a solution containing an alkali and a phenol. Phenol being electrolytically dissociated in aqueous solution to exhibit the acidic characteristics of weaker acids, combines with the alkali present to form a salt. In consequence, however, of the relatively feeble acidic properties of phenol, said salt is hydrolyzed to such extent as to provide a solution having an alkaline reaction with an absorptive capacity for the weak gaseous acids to be removed from the gaseous mixture treated in the absorption stage. Furthermore, the phenol being somewhat more weakly acidic than the acidic gases, is displaced or "sprung" from combination with the alkali, so that the alkali phenolate present in the solution serves as a continuous source of alkali to combine with the acidic gases. The liberated phenol, being water soluble, is carried in solution in the fouled washing medium as it flows from the absorption step to the regeneration step, or, if present in concentrations such that the quantities of liberated phenol exceed its solubility in the scrubbing solution, will separate from said solution in a liquid phase, as for example an emulsion, which flows from the gas-and-liquid contact apparatus, entrained in the scrubbing solution entering the regeneration step.

In the regeneration step, the fouled solution enetrs a regenerating column or actifier where the temperature is substantially raised, preferably to the boiling point, whereby the escaping water vapors, by their sweeping action, remove the gaseous impurities absorbed from the gaseous mixture; following which, the solution, with its impurity absorbing ability substantially restored to its former capacity, is cooled and reintroduced into the gas-and-liquid contact apparatus to be recycled for the removal of more impurities from a new quantity of the gaseous mixture.

From this brief description of a liquid purification process embracing the use of a phenolate solution having an alkaline reaction, it becomes apparent that in the absorption step of such a process, the presence of the phenol or its homologues in the washing solution, in consequence of their acidic properties being less than those of the acidic gases being absorbed at the temperatures obtaining in the absorption step, do not interefere substantially with the absorption of the impurities.

In the regeneration or actification step, however, the presence of the phenol or its homologues plays an important rôle at the regeneration temperatures. At the elevated temperatures obtaining in this step, the absorbed impurities show an increased partial pressure in the vapors above the solution, which fact promotes the breaking up of their combinations with the alkali removed from combination with the phenols, and promotes their displacement from the fouled solution by a sweep-gas such as steam. The previously liberated phenols still present in the fouled solution, thereupon recombine with the alkali liberated by the volatilized impurities, such as hydrogen sulphide, and reform the alkali phenolate, and if they have been liberated in the absorption step in such quantities as to exceed their solubility in the purification solution, are taken up by said alkali and returned into solution from the phase into which they were previously separated during the absorption. Furthermore, at the elevated temperatures of solution regeneration, the phenols exhibit an increased electrolytic dissociation, with a consequently increased acidity, which tends to crowd out and displace the acidic impurities absorbed in the absorption step and so by their presence, tend to assist and accelerate the regeneration of the fouled solution's absorbing ability.

The vapors evolved during the regeneration step are dephlegmated and at such temperatures that any phenols incidentally volatilized with the impurities, such as hydrogen sulphide, are returned to the scrubbing solution, while the hydrogen sulphide and the like are allowed to flow from the regeneration apparatus to further disposition or utilization, such for instance as its special adaptation to sulphuric acid production.

The afore-mentioned characteristics of a phenolic group, i. e. its electrolytic dissociation in aqueous solution to yield a relatively low concentration of hydrogen ions, similar to certain substances which in consequence of their chemical constitution are properly called acids, and the ability of the phenolic group to combine with alkalies to form soluble salts which are hydrolyzed in solution to impart to the same an alkaline reaction, provide this hydroxyl group with special attributes which make it especially significant and adaptable to a hot-actification liquid purification process for gas, according to the process disclosed in the aforementioned and copending application.

I have found that these unique characteristics of the phenolic hydroxyl group are not restricted to that group in the simple compound phenol, but are the common property of all hydroxyl groups attached directly to the benzene nucleus; that is to say, not only does phenol conform to my requirements, but the dihydric and polyhydric phenols likewise exhibit substantially these same characteristics preferred in the simple member of this class of chemical entities. Furthermore, a wide variety of substituents may be introduced into the benzene nucleus containing a phenolic hydroxyl group or groups, without altering substantially for gas purification purposes the characteristics of the phenolic hydroxyl group or groups also present, and certain substituents, as will be hereinafter shown, offer operating advantages in special applications of this method of purification. Such substituents include: alkyl groups, methoxy or ethoxy groups and the like, strongly acidic groups derived from the polybasic acids such as the sulphonic or carboxylic group, a phenyl group, which with phenol yields the compound hydroxy-diphenyl and a reduced benzene nucleus or reduced sulphur or combinations thereof. Hydroxyl derivatives of naphthalene, and substituted derivatives thereof made from the substituents in the above-mentioned groups, including halogen and nitro groups, as well as reduced derivatives of naphthalene such as ar-tetrahydro-naphthol, which contains a phenolic group substituted in the unaltered benzene nucleus, and tyrosine may be mentioned by way of example as suitable for my purpose.

In general, the substitution of a negative group into the aromatic nucleus increases somewhat the electrolytic dissociation of an hydroxyl group attached to the same nucleus. This increase in acidic properties is of a relatively minor order, however, and any tendency to increased acid ionization of the hydroxyl group so induced, which would have a tendency to reduce the efficiency in the absorption step, is compensated for by its increased effectiveness in the actification step.

The acidic characteristics of negative groups substituted in the benzene nucleus, if such negative groups are electrolytically dissociable in aqueous solution to produce hydrogen ions, as for example obtains in the case of the sulphonic or carboxylic groups, are of such order of magnitude as to remove them from the class of groups preferred for their special effectiveness in the actual absorption or actification reactions of a liquid purification process of this type.

Substituent groups belonging to this class and found attached directly to the benzene nucleus in such compounds as for example anthranilic, benzoic and benzene sulphonic acids, are relatively such strong acids that weakly acidic gases of the nature of hydrogen sulphide, hydrogen cyanide and the like, cannot displace them from their combinations with strong alkalies, and in consequence of this characteristic, circulating solutions carrying their salts in a hot-actification liquid purification process would have only relatively minor absorption effectiveness for the weakly acidic gases above-mentioned.

However, when a phenolic hydroxyl group is also present in the same molecule as the sulphonic or carboxylic group or their equivalents, the desired chemical characteristics exhibited by that phenolic group, when the same is the sole substituent in the nucleus, remain substantially unaltered for my purpose and conform to my requirements in both the absorption and actification stage of the purification process.

Having now disclosed that substituted phenols, in general, are effective in a hot-actification liquid purification process, I will now show that certain advantages accrue from their use in such a process, these advantages resulting from the inherent chemical nature of the substituent itself or from alteration of certain physical characteristics of the phenol molecule, effected by such substituents, which are essentially divorced from and with practically no influence on the preferred reactions of the phenolic group and therefore incidental thereto.

Generally speaking, as the hydrogen atoms on the aromatic nucleus of phenol are replaced by heavier substituents, the vapor pressure of the resulting substances is decreased from that obtaining for phenol at corresponding temperatures. This reduction in vapor pressure is highly desirable in a liquid purification process of the type under consideration. As afore-described, in the absorption step, the alkali salt of the phenol is "sprung" by the weakly acidic gases to liberate phenol which then exists in the recirculated solution either in solution or, if its solubility therein is exceeded, remains separated therefrom until redissolved in the actification step. The so liberated phenol exhibits a higher vapor pressure than when present in the washing solution as a phenolate and in consequence thereof, an increased tendency to vaporize into the gaseous mixture being scrubbed and be carried along therewith in the vapor phase when said mixture passes from the absorber. Any loss of the reagent so incurred must be substituted by new additions of the same to the solution and, although the amounts involved may be relatively small, they occasion operating inconvenience and are an added expense. It becomes apparent therefore, that any measures taken to alter the nature of the molecule carrying the phenolic radical, so that the molecule exhibits substantially equivalent effectiveness for the purpose disclosed but is accompanied by a decreased vapor pressure, provide improved operating conditions and economic aspects to a process for the liquid purification of gas, which is based on the special characteristics and reactions of the hydroxyl group affixed directly to the benzene nucleus.

Of the available nucleus substituents which will accomplish the purpose of my present improvement, some provide decided advantages over others. If a substituent belongs to that group of radicals dissociated electrolytically to furnish acids having greater dissociation constants than the weekly acidic gases it is desired to remove from the processed gaseous mixture, as obtains in the case of a sulphonic or carboxylic group or their equivalents affixed directly to the benzene ring, such groups have only incidental effect on the preferred reactions involving the removal of the acidic gases, but contribute highly desirable characteristics to the molecule in which the phenolic radical is also embodied. Their presence in the molecule in the aforementioned orientation imparts thereto, in general, an ability to form relatively stable salts with alkalies. These salts are water soluble and little hydrolyzed, and the phenolic group in such compounds when "sprung" from combination with alkali in the absorption step, is still attached to a molecule of relatively high solubility, so that any inconveniences which might present themselves due to the segregation of a less soluble reagent in the absorber, are obviated. Moreover, these acid radicals, which exhibit relatively strong acidic characteristics and consequently remain combined with alkali during the absorption stage, not only function to retain the reagent in solution but to reduce its vapor pressure significantly below that obtaining were such groups not present in the molecule, so that losses due to vaporization of the reagent during the absorption and expelling of the acidic gases are negligible. In other words, the presence of acidic groups, such as the sulphonic, carboxylic and the like combined with an alkali, as substituents in the aromatic nucleus of a compound containing a phenolic hydroxyl group, acts as a sort of anchor to retain that compound in solution and inhibits its vaporization.

It is of course understood, that when the substituted phenolic compounds offered as reagents by my improvement of a method for the liquid purification of gas, contain a relatively strong acidic group as the sole or one of the substituents in the hydroxyl bearing aromatic nucleus, sufficient of the preferred alkali is added to the solution containing said compound or compounds to completely satisfy the acid requirements of the acid derived substituent or substituents before establishing the preferred molar relationship between the alkali and phenolic group or groups. The alkali used for neutralization of the acid derived substituents plays only an incidental rôle in the purification reactions, and is not available for the absorption of the weakly acidic gases.

It is already known to me that certain organic acids containing a sulphonic or carboxylic group, have been used for a purpose similar to that herein disclosed. The compounds so used, however, have had their sulphonic or carboxylic groups attached at the ends of alipahtic chains containing simultaneously an amino or imino group and in such disposition and relationship in molecules, the acidic nature of these acid groups is significantly reduced below that obtaining for the weakly acidic gases it is desired to absorb, thus making alkalies combined with acids of this type in the absorption solution, readily available for combining with the acidic gases to promote their absorption.

When, however, the sulphonic or carboxylic radical is a substituent in the benzene nucleus, as is the case in such compounds as phenol-sulphonic acid, salicyclic acid, phthalic acid, nitro-phthalic acid, naphthol-sulphonic acids and the like, they exhibit such strongly acidic properties that the weakly acidic gases, like hydrogen sulphide, are unable to effectively displace them from combinations with alkalies. In consequence of this fact, it becomes apparent that alkali salts of the sulphonic and carboxylic radicals, and the like, attached directly to the benzene nucleus are ineffective absorbents for the removal of weakly acidic gases from mixtures containing them. An hydroxyl group, however, simultaneously attached to the benzene nucleus along with a sulphonic or carboxylic group, retains those characteristics which the hydroxyl radical exhibits in the compound phenol and which make it eminently desirable for the application under consideration.

It is, therefore, further apparent, as beforesaid, that even though the acid radicals of the aforementioned type are too highly dissociated electrolytically to function in the cyclic absorption and actification reactions, they nevertheless contribute to the molecule simultaneously containing phenolic groups properties which are incidental to said reactions but highly desirable in a compound used for promoting a liquid purification process based on the special characteristics and reactions of a phenolic radical or radicals.

In consequence of the fact that these substituted phenols have less tendency to be vaporized from the washing solution than phenol and more especially so at elevated temperatures they become particularly significant in those applications of this method of purifying gases where the gaseous mixtures are maintained at the higher temperature levels during the scrubbing process.

The following examples will show results that have been obtained by using the substituted phenols of my invention as media according to the present improvement for the removal of weakly acidic gases from mixtures containing them.

*Example 1*

A gaseous mixture containing 5% by volume of hydrogen sulphide and under 100 lbs. pressure per sq. in. was washed at a temperature of 150° F. with an aqueous solution containing 3.78 moles of sodium phenol-sulphonate and 3.3 moles of potassium hydroxide per gallon 32.5 gallons of solution being used per 1000 cu. ft. of gas at normal temperature and pressure. 95% of the hydrogen sulphide was removed from the gas. The fouled solution was removed from contact with the gas and boiled and 71.4% of the hydrogen sulphide absorbed by the solution in the absorption stage was removed when 11.7 lbs. of steam were evaporated therefrom.

*Example 2*

A mixture of gases at a pressure of 110 lbs. per sq. in. and containing 3.5% by volume of hydrogen sulphide, was scrubbed with a solution having the same analysis as that in the above-given example and at a temperature of 77° F. When the equivalent of 1000 cu. ft. of gas at normal temperature and pressure, was brought into contact with 18.3 gallons of the scrubbing solution 99.99% of the hydrogen sulphide was removed from the gaseous mixture. The total fouled solution was then sent to the regeneration tower and heated to the boiling point where 97.2% of the absorbed hydrogen sulphide was removed therefrom by the evaporation of 36.8 lbs. of steam.

Example 3

A gaseous mixture containing 5% by volume of hydrogen sulphide and at a pressure of 100 lbs. per sq. in. was scrubbed at a temperature of 25° C. with an aqueous solution containing 6.62 moles of sodium para-hydroxy-benzoate and 4.77 moles of sodium hydroxide per gallon. 95% of the hydrogen sulphide was removed from the gaseous mixture when 150 gallons of said solution were brought into contact with 1000 cu. ft. of compressed gas. The fouled solution contained 2360 grains of hydrogen sulphide per gallon and after heating the same to the boiling point and passing therethrough 7.83 lbs of steam per gallon of fouled solution, an actified solution containing 1000 grains of hydrogen sulphide per gallon was produced which was returned to the process to treat new quantities of the gaseous mixture.

Example 4

A gas such as is obtained in the pyrogenetic decomposition of high molecular weight petroleum products and which contained approximately 8000 grains of hydrogen sulphide per 100 cu. ft. was treated at a temperature of 25° C. in a gas and liquid contact tower with a solution containing 3.785 moles of the sodium salt of p-hydroxy acetophenone per gallon. 97.6 gallons of this solution were employed per each 1000 cu. ft. of compressed gas passed into the apparatus. The outlet gas from the contact tower contained 400 grains of hydrogen sulphide per 100 cu. ft. The washing process therefore had removed 95% of the hydrogen sulphide contained in the untreated gas. The fouled solution containing about 1010 grains of hydrogen sulphide per gallon was continuously withdrawn from the scrubbing tower and supplied to a stripping column where said fouled solution was heated to boiling and steam passed therethrough at the rate of 0.41 lb. per gallon of solution. The solution issuing from the stripping column contained about 230 grains of hydrogen sulphide per gallon. This solution was then returned to the gas and liquid contact tower for the washing of new quantities of the raw gas. The vapors issuing from the stripping apparatus are then cooled to condense the steam, the hydrogen sulphide gases being disposed of or utilized, as for example, for the manufacture of sulphuric acid in any preferred manner.

In the following claims, it will be understood that the term "organic acid" is used to refer to such acids as are generally considered to be organic in nature and that therefore alkali derivatives of carbonic acid are not intended to be included. An aromatic compound is understood to be one containing at least one so-called "benzene" or "aromatic" nucleus of six carbon atoms, the simplest and unsubstituted form of which is the compound benzene; hence, an aromatic acid is one containing at least one such nucleus in its molecular structure. A phenolic group or radical is an hydroxyl group substituted for one of the hydrogens of the benzene nucleus and therefore becomes a nuclear substituent. A phenolic acid is a compound containing within its molecular structure a phenolic group and an acid radical such as the sulphonic, carboxylic group or the like which may or may not be attached directly to the benzene nucleus but which is electrolytically dissociated in aqueous solution to produce hydrogen ions.

In order that my above-given premises may be more clearly understood, I will cite examples of compounds containing the benzene nucleus which are not appropriate for my process of gas purification but which by reason of substitution of an hydroxyl radical into such compounds and in a position imparting phenolic properties thereto, the compounds then become especially suitable for the purpose of my present invention. Benzoic acid ($C_6H_5.COOH$) having a carboxyl radical attached directly to the benzene nucleus, and phenyl-acetic acid ($C_6H_5.CH_2.COOH$) with its carboxyl radical at the end of an aliphatic chain substituted in the benzene nucleus, are both mono-basic acids which are too highly dissociated electrolytically to permit any alkali metals combined with the carboxyl group being available for effective combination with the weakly acidic gases such as hydrogen sulphide, carbon dioxide and the like. However, when compounds having this same general structure have an hydroxyl group substituted for one or more of the hydrogen atoms of the benzene nucleus to form such compounds as para-hydroxy-benzoic acid

($HO.C_6H_4.COOH$)

or hydroxy-phenyl-acetic acid

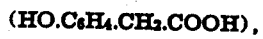

($HO.C_6H_4.CH_2.COOH$), which acids are capable of combining with two atoms of an alkali metal, they are appropriate for the herein described process of gas purification by reason of the phenolic hydroxyl group, which although combined with an alkali metal in a solution, is so weakly held thereby that the alkali becomes available for the absorption of the above-mentioned weakly acidic gases, and the alkali metal in combination with the carboxyl group, although not available for the absorption of the acidic gases, provides the substance with the highly desirable characteristics afore-mentioned.

As an added example, benzene sulphonic acid ($C_6H_5.SO_2OH$) is too strong an acid for my purpose but phenol sulphonic acid ($HO.C_6H_4.SO_2OH$) provides the herein-described highly desirable results.

The invention as hereinabove set forth is embodied in particular form and manner but may be variously embodied within the scope of the claims hereinafter made.

I claim:

1. A process for the removal of hydrogen sulphide, hydrogen cyanide, carbon dioxide and the like from mixtures containing them which comprises, washing said mixtures with an alkaline solution containing a base in combination with a chemical compound containing at least one benzene nucleus on separate carbon atoms of which are an hydroxyl group and a carboxylic group, the absorption solution being regenerated with heat.

2. A process for removing hydrogen sulphide, and the like, from gaseous mixtures containing the same which comprises washing the gaseous mixture at elevated temperatures not exceeding 90° C. with an alkaline solution containing the salt of a base in combination with an organic acid, said acid containing at least one acid group selected from the group consisting of carboxylic and sulfonic groups and capable of removing hydrogen sulphide and the like from combination with alkalies at ordinary temperatures and at least one phenolic benzene nucleus having an hydroxyl group attached thereto which exhibits no substantially greater acidic nature than hydrogen sulphide at the washing temperature, the absorption solution being regenerated with heat.

3. A process for removing weakly acidic gases of the nature of hydrogen sulphide, hydrogen cyanide, carbon dioxide, and the like, from gaseous mixtures containing them and comprising, scrubbing the gaseous mixture with an alkaline solution of an acid selected from the group consisting of the phenol- and naphthol-sulphonic acids and their substitution derivatives, the absorption solution being regenerated with heat.

4. A claim as claimed in claim 3 in which the acid is selected from the group consisting of the hydroxy-benzoic acid, hydroxy-naphthoic acids and their substitution derivatives.

5. A process for separating hydrogen sulphide, and the like, from gaseous mixtures containing them and comprising, washing the gaseous mixture with a solution containing an acid selected from the class consisting of phenol-sulphonic acid and its substitution derivatives in combination with a base selected from the group consisting of the alkalies and alkaline earths, said base being present in excess of that required by the acid radicals to about nine-tenths satisfy the stoichiometrical requirements of the phenol hydroxyl groups.

6. A process for the removal of weakly acidic gases from mixtures containing the same comprising: scrubbing the gaseous mixture with an alkaline solution containing a soluble salt of a phenolic acid that comprises a chemical compound containing the benzenes nucleus on separate carbon atoms of which are substituted a phenolic hydroxyl group and an acid group that is at least dibasic having at least one hydroxyl reactable with alkali, said solution containing sufficient alkali to combine with the acid group and the major portion of the phenol group, the absorption solution being regenerated with heat.

7. A process for the removal of weakly acidic gases from mixtures containing the same comprising, scrubbing the gaseous mixture with an aqueous solution of a base in combination with a chemical compound comprising a benzene nucleus on separate carbon atoms of which are substituted at least one phenolic hydroxyl group and an acid group derived from an acid that is at least dibasic, said solution containing sufficient base to form the salt of the acid and also replace hydrogen from the major portion of the phenolic hydroxyl groups in the solution, the absorption solution being regenerated with heat.

8. A process for the removal of weakly acidic gases from mixtures containing the same comprising, scrubbing the gaseous mixture with an alkaline solution of a base in combination with an organic acid comprising a benzene nucleus on separate carbon atoms of which are substituted a phenolic hydroxyl group from which a therewith combined base can be displaced by the weakly acidic gas to be absorbed and an acid group that is at least dibasic having at least one hydroxyl reactable with alkali, the electrolytic dissociation of which is greater than that of said acidic gas and from which a therewith combined base cannot be displaced by said gas, there being sufficient alkali to combine with the acid group and at least the major portion of the phenol group, and the absorption solution being regenerated with heat.

9. A process for the separation of weakly acidic gases of the nature of hydrogen sulphide, hydrogen cyanide, carbon dioxide, and the like, from mixtures containing the same, which comprises: washing said mixtures with an alkaline solution containing a base in combination with a mixture of organic acids of which one component is a compound having a benzene nucleus on separate carbon atoms of which are a phenolic hydroxyl group and an acid group derived from an acid that is at least dibasic, there being sufficient alkali to combine with the acid group and at least the major portion of the phenol group, and the absorption solution being regenerated with heat.

10. A process for the removal of weakly acidic gases of the nature of hydrogen sulphide, hydrogen cyanide, carbon dioxide, and the like, from mixtures containing them which comprises, scrubbing said mixtures with an aqueous solution containing a base selected from the alkali and alkaline earth metal groups in combination with an organic acid comprising a benzene nucleus on separate carbon atoms of which are substituted for hydrogen atoms at least one phenolic hydroxyl group and at least one other substituent that is acidic and derived from an acid that is at least dibasic, said other substituent having a substantially higher electrolytic dissociation constant than said weakly acidic gases, the solution containing sufficient base to combine with the said other substituent and at least the major portion of the phenolic hydroxyl groups in the solution that are attached directly to the benzene nucleus, and the absorption solution being regenerated with heat.

11. A continuous process for removing weakly acidic gases such as hydrogen sulphide, hydrogen cyanide, carbon dioxide and the like, from gaseous mixtures containing them, which comprises, absorbing acidic gases from the gaseous mixture by washing the same with an aqueous solution containing an organic acid comprising a benzene nucleus on separate carbon atoms of which are a phenolic hydroxyl group and an acid group that is at least dibasic having at least one hydroxyl reactable with alkali capable of displacing the weakly acidic gases from combination with strong alkalies at ordinary temperature, and sufficient base selected from the group consisting of the alkali and alkaline earth metals to combine with the acid radicals and at least the major portion of the phenolic hydroxyl groups in the solution; withdrawing the washing solution from contact with the gaseous mixture; elevating the temperature of the washing solution to liberate absorbed acidic gases; and scrubbing a new volume of the gaseous mixture with the actified solution.

12. A process for the separation of hydrogen sulphide from gaseous mixtures containing the same, characterized by the gaseous mixture being scrubbed with an alkaline solution containing a soluble constituent having a substituted benzene nucleus containing a phenolic hydroxyl group or groups attached to said benzene nucleus and another group chosen from the class consisting of the sulphonic and carboxylic groups.

13. A process as claimed in claim 12, and in which the substituent from the class consisting of sulphonic and carboxylic groups is attached through intermediate linkage to the benzene nucleus.

14. A process as claimed in claim 12, and in which the substituent from the class consisting of sulphonic and carboxylic groups is directly attached to the benzene nucleus.

HERBERT A. GOLLMAR.